United States Patent
Kang et al.

(10) Patent No.: US 11,696,574 B2
(45) Date of Patent: Jul. 11, 2023

(54) SPINNING REEL

(71) Applicant: SHIMANO COMPONENTS (MALAYSIA) SDN. BHD., Johor (MY)

(72) Inventors: Foong Wei Kang, Johor (MY); Chan Yik Hui, Johor (MY); Mohd Hisyamuddin Bin Kamn, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 0 days.

(21) Appl. No.: 17/740,913

(22) Filed: May 10, 2022

(65) Prior Publication Data

US 2022/0394967 A1 Dec. 15, 2022

(30) Foreign Application Priority Data

Jun. 14, 2021 (JP) .............................. JP2021-098830
Jul. 28, 2021 (JP) .............................. JP2021-123205

(51) Int. Cl.
*A01K 89/01* (2006.01)
(52) U.S. Cl.
CPC ................................ *A01K 89/0114* (2013.01)
(58) Field of Classification Search
None
See application file for complete search history.

(56) References Cited

U.S. PATENT DOCUMENTS

| 4,524,923 | A  | * | 6/1985 | Tunoda | A01K 89/027 |
| | | | | | 242/282 |
| 2002/0003182 | A1 | * | 1/2002 | Takikura | A01K 89/0114 |
| | | | | | 242/279 |
| 2005/0127221 | A1 | * | 6/2005 | Morise | A01K 89/0114 |
| | | | | | 242/242 |
| 2007/0029425 | A1 | * | 2/2007 | Young | A01K 89/0114 |
| | | | | | 242/242 |
| 2016/0345561 | A1 | * | 12/2016 | Nishikawa | A01K 89/01143 |
| 2019/0327948 | A1 | * | 10/2019 | Chan | A01K 89/0186 |

FOREIGN PATENT DOCUMENTS

JP 2004-65119 A 3/2004

* cited by examiner

*Primary Examiner* — Emmanuel M Marcelo
(74) *Attorney, Agent, or Firm* — Global IP Counselors, LLP (57) ABSTRACT

A spinning reel includes a reel body, a handle shaft rotatably supported with respect to the reel body, a spool shaft movably supported in a front-rear direction with respect to the reel body, a reciprocator including a first gear configured to rotate in a first direction of rotation in conjunction with rotation of the handle shaft, a second gear including a gear body configured to mesh with the first gear and a first boss portion protruding from the gear body and configured to rotate in a second direction of rotation opposite to the first direction of rotation, and a slider mounted on the spool shaft and including an engagement groove with which the first boss portion is configured to engage, and a limiter disposed between the reel body and the second gear and being configured to limit rotation of the second gear in the first direction of rotation.

7 Claims, 7 Drawing Sheets

SPINNING REEL

CROSS-REFERENCE TO RELATED APPLICATIONS

This application claims priority to Japanese Patent Application No. 2021-098830, filed on Jun. 14, 2021 and Japanese Patent Application No. 2021-123205, filed on Jul. 28, 2021. The entire disclosures of Japanese Patent Application Nos. 2021-098830 and 2021-123205 are hereby incorporated by reference.

BACKGROUND

Field of the Invention

The present invention relates to a spinning reel.

Background Art

A reciprocating mechanism is disclosed in a conventional spinning reel (refer to Japanese Published Unexamined Application No. 2004-065119). The conventional reciprocating mechanism comprises a sliding gear that rotates in conjunction with the rotation of a handle shaft, a cam gear that meshes with the sliding gear, and a slider. The cam gear includes a gear body that meshes with the sliding gear and a boss portion that protrudes from the gear body. The boss portion engages an engagement groove of the slider. The boss portion moves along the engagement groove, thereby moving the spool in a front-rear direction via a spool shaft.

SUMMARY

When the spool moves in the front-rear direction via the spool shaft in the conventional reciprocating mechanism, it is possible that the force that acts on the spool in the spool shaft direction will cause the engagement between the sliding gear and the cam gear to become unstable.

Embodiments of the present invention were made in light of the above-described problems, and an object of the present disclosure is to provide a spinning reel capable of preventing the meshing between the sliding gear and the cam gear from becoming unstable. That is, an object of the present disclosure is to provide a spinning reel capable of preventing the meshing between a first gear and a second gear from becoming unstable.

A spinning reel according to one aspect of the present invention comprises a reel body, a handle shaft, a spool shaft, a reciprocating mechanism, and a rotation limiting member. The handle shaft is rotatably supported by the reel body. The spool shaft is supported by the reel body so as to be movable in the front-rear direction.

The reciprocating mechanism has a first gear, a second gear, and a slider. The first gear rotates in a first direction of rotation in conjunction with rotation of the handle shaft. The second gear rotates in a second direction of rotation opposite to the first direction of rotation. The second gear includes a gear body that meshes with the first gear and a first boss portion that protrudes from the gear body. The slider is mounted on the spool shaft and includes an engagement groove with which the first boss portion engages. The rotation limiting member is disposed between the reel body and the second gear. The rotation limiting member restricts the rotation of the second gear in the first direction of rotation.

In the spinning reel of the present disclosure, when the first gear rotates in the first direction of rotation, the second gear rotates in the second direction of rotation. At this time, because the rotation limiting member restricts the rotation of the second gear in the first direction of rotation, it is possible to prevent an unstable meshing between the first gear and the second gear.

In the spinning reel according to another aspect of the present invention, the rotation limiting member is preferably a sliding member that is integrally rotated with the second gear and slides with respect to the reel body. In this embodiment, because the sliding member slides with respect to the reel body, friction force is generated between the sliding member and the reel body. That is, the force of friction acts on the second gear via the sliding member. As a result, it is possible to prevent an unstable meshing between the first gear and the second gear.

In the spinning reel according to another aspect of the present invention, the reel body preferably has a second boss portion that rotatably supports the second gear. In this embodiment, the sliding member is disposed between the second gear and the second boss portion and slides with respect to the second boss portion.

In this spinning reel, because the sliding member slides with respect to the second boss portion of the reel body, friction force acts on the second gear via the sliding member. As a result, it is possible to prevent an unstable meshing between the first gear and the second gear.

In the spinning reel according to another aspect of the present invention, the second gear preferably has a groove disposed on the gear body. In this embodiment, the sliding member has an engagement portion that engages with the groove, and a sliding portion that is formed integrally with the engagement portion, extends along the outer surface of the second boss portion, and slides with respect to the outer surface of the second boss portion.

In the spinning reel, the engagement portion of the sliding member engages with the groove of the second gear, thereby causing the sliding member to rotate integrally with the second gear. In this state, because the sliding portion of the sliding member slides with respect to the outer surface of the second boss portion, friction force acts on the second gear via the sliding member. As a result, it is possible to prevent an unstable meshing between the first gear and the second gear.

In the spinning reel according to another aspect of the present invention, the sliding portion is formed in an arc shape. The sliding portion extends from the engagement portion along the outer surface of the second boss portion in the second direction of rotation.

In the spinning reel, when the handle shaft and the first gear are rotated in the first direction of rotation in order to wind the fishing line, the second gear rotates in the second direction of rotation. The direction in which the arc-shaped sliding portion extends along the outer surface of the second boss portion is the same as the second direction of rotation in which the second gear rotates. Therefore, when the fishing line is wound, since the internal diameter of the arc-shaped sliding portion increases, the friction force that acts on the sliding member can be reduced. As a result, the handle shaft can be smoothly rotated when the line is wound.

On the other hand, when an attempt is made to rotate the second gear in the first direction of rotation, since the internal diameter of the arc-shaped sliding portion decreases, the friction force that acts on the sliding member can be increased. As a result, it is possible to prevent an unstable meshing between the first gear and the second gear.

In the spinning reel according to another aspect of the present invention, the second boss portion preferably comprises a boss body and a tubular member that is mounted on the outer circumference of the boss body so as to be rotationally rigid. In this embodiment, the sliding member is disposed between the second gear and the tubular member and slides with respect to the tubular member.

In the spinning reel, the tubular member is mounted on the outer circumference of the boss body so that the tubular member cannot rotate relative to the boss body. In this state, the sliding member slides with respect to the tubular member. Even with this configuration, friction force acts on the second gear via the sliding member. As a result, it is possible to prevent the meshing between the first gear and the second gear from becoming unstable. In addition, in this configuration, when the tubular member becomes worn, the tubular member can be easily replaced.

In the spinning reel according to another aspect of the present invention, the reel body preferably has a second boss portion that rotatably supports the second gear. In this embodiment, the rotation limiting member is a one-way clutch that is disposed between the second gear and the second boss portion. The one-way clutch enables rotation of the second gear in the second direction of rotation and restricts the second gear from rotating in the first direction of rotation.

In this spinning reel, when the handle shaft and the first gear are rotated in the first direction of rotation in order to wind the fishing line, the second gear rotates in the second direction of rotation. Here, because the one-way clutch allows rotation of the second gear in the second direction of rotation, the handle shaft can be smoothly rotated as the line is wound. On the other hand, because the one-way clutch restricts the second gear from rotating in the first direction of rotation, it is possible to prevent the meshing between the first gear and the second gear from becoming unstable.

In embodiments of the present invention, it is possible to prevent the meshing between the first gear and the second gear of the spinning reel from becoming unstable.

DETAILED DESCRIPTION OF EMBODIMENTS

First Embodiment

Figure 1:
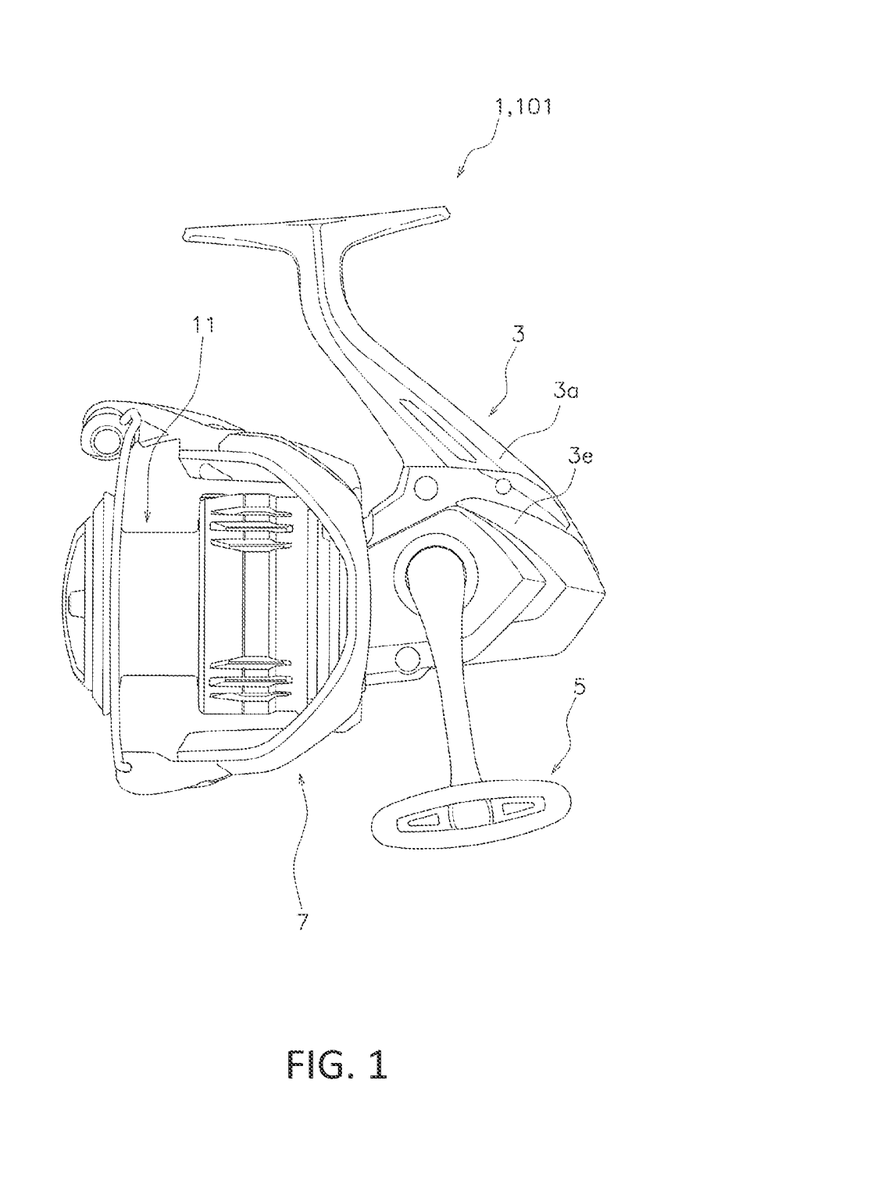
FIG. 1 is a side view of a spinning reel according to a first embodiment of the present invention.
Figure 2:
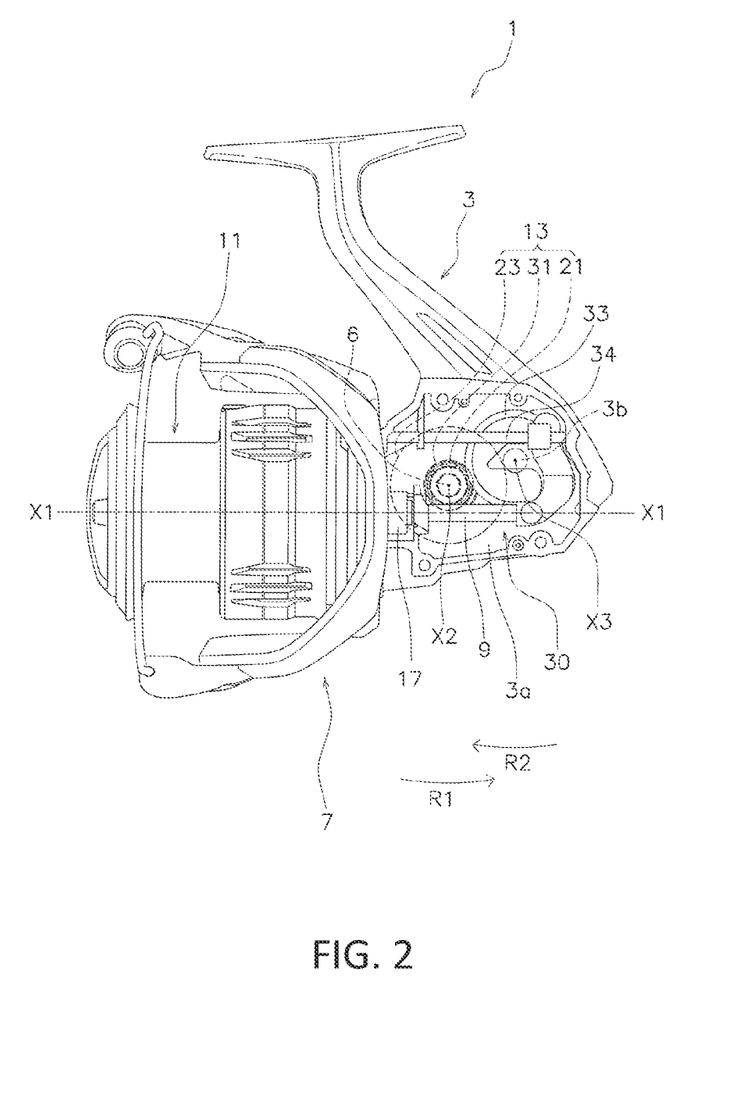
FIG. 2 is a side view in which the side cover and the driver are removed from the spinning reel.
Figure 4:
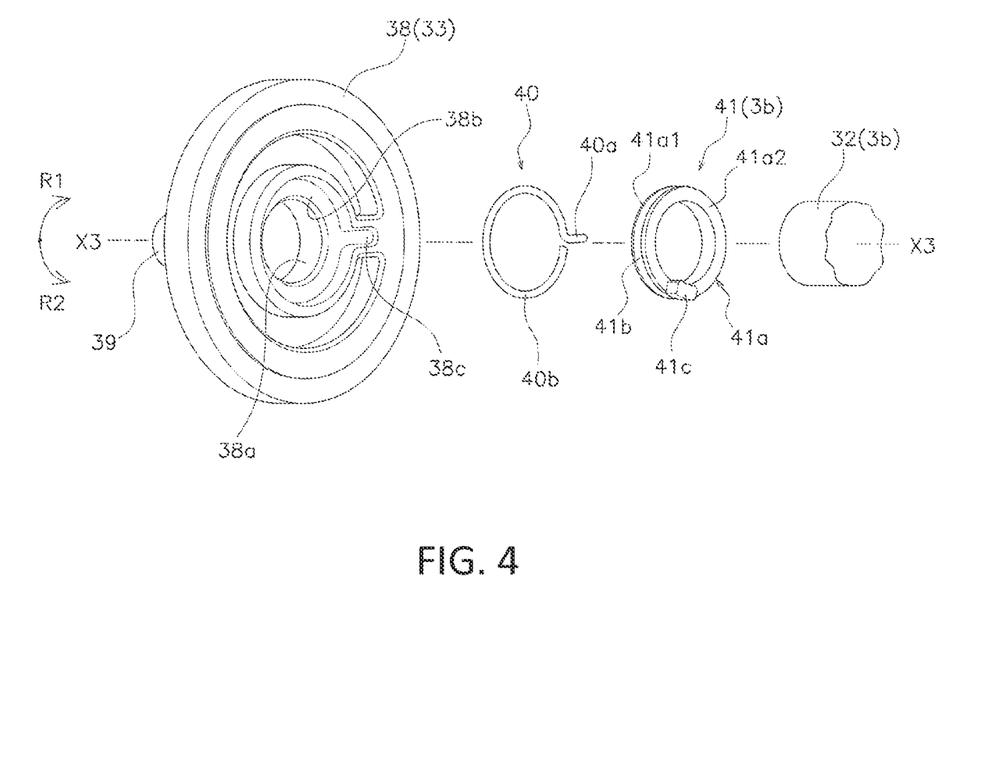
FIG. 4 is an exploded perspective view for explaining configurations of the sliding member and the tubular member.

As shown in FIG. 1, a spinning reel 1 in which a first embodiment of the present invention is employed has a reel body 3, a handle 5, a rotor 7, a spool 11, a driver 13 (refer to FIG. 2), an oscillating mechanism (oscillator) 30 (one example of a reciprocating mechanism (reciprocator), refer to FIG. 2), and a sliding member (slider) 40 (one example of a rotation limiting member (limiter); refer to FIG. 4).

As shown in FIG. 1, the handle 5 is rotatably supported by the reel body 3. In the present embodiment, an example in which the handle 5 is disposed on the left side of the reel body 3 is shown. The handle 5 can be disposed on the right side of the reel body 3. As shown in FIG. 2, the oscillating mechanism 30 for moving the spool 11 in the front-rear direction is disposed in an internal space of the reel body 3.

The rotor 7 is used for winding a fishing line around the spool 11. As shown in FIGS. 1 and 2, the rotor 7 is disposed at the front of the reel body 3. The rotor 7 is configured to be rotatable with respect to the reel body 3. For example, as shown in FIG. 2, the rotor 7 is connected to a pinion gear 17 so as to be integrally rotatable therewith. The pinion gear 17 is rotatably supported by the reel body 3. The rotor 7 rotates in conjunction with the rotation of the pinion gear 17.

A fishing line is wound around the spool 11. The spool 11 is configured to be integrally movable with spool shaft 9. For example, as shown in FIG. 2, the spool 11 is mounted on the distal end portion of the spool shaft 9.

The spool shaft 9 is configured to be able to advance and retract with respect to the reel body 3. The spool shaft 9 is supported so as to be movable in a front-rear direction with respect to the reel body 3. The spool shaft 9 is inserted through the inner circumferential portion of the pinion gear 17. The spool shaft 9 is moved back and forth in reciprocating fashion with respect to the reel body 3 by operation of the oscillating mechanism 30. The front-rear direction is the direction in which spool axis X1 of the spool shaft 9 extends.

As shown in FIG. 2, the driver 13 has a drive shaft 21, a drive gear 23, and a sliding gear 31 (one example of the first gear). The drive shaft 21 rotates in conjunction with the rotation of the handle 5. For example, a handle shaft 6 of the handle 5 is mounted on the drive shaft 21.

The drive shaft 21 has drive axis X2. For example, the drive shaft 21 is formed with a tubular shape. The handle shaft 6 is attached to the inner circumferential portion of the drive shaft 21 so as to be removable. The handle shaft 6 is rotatably supported by the reel body 3. The axis of the handle shaft 6 is concentric with drive axis X2.

The drive gear 23 is used to rotate the rotor 7. The drive gear 23 is disposed on the drive shaft 21. The drive gear 23 meshes with the pinion gear 17.

The sliding gear 31 is used to move the spool shaft 9. The sliding gear 31 rotates in first direction of rotation R1 in conjunction with the rotation of the handle shaft 6. The sliding gear 31 is disposed on the drive shaft 21 at a distance from the drive gear 23 in the axial distance in which drive axis X2 extends. The spool shaft 9 and a guide shaft 34 (described further below) are arranged between the drive gear 23 and the sliding gear 31. The sliding gear 31 meshes with a cam gear 33 (one example of the second gear), described further below.

The drive shaft 21, the drive gear 23, and the sliding gear 31 are integrally formed. The drive shaft 21, the drive gear 23, and the sliding gear 31 can also be formed as discrete bodies. The drive shaft 21, the drive gear 23, and the sliding gear 31 rotate in conjunction with the rotation of the handle shaft 6. When the drive gear 23 and the sliding gear 31 are rotated, the pinion gear 17 and the cam gear 33 are rotated.

For example, in the present embodiment, the direction of rotation in which the handle shaft 6, the drive shaft 21, the drive gear 23, and the sliding gear 31 rotate in order to wind the fishing line is defined as first direction of rotation R1. The direction of rotation opposite to the first direction of rotation R1 is defined as second direction of rotation R2. The first direction of rotation R1 and the second direction of rotation R2 are defined with respect to the center of each of drive axis X2 and axis X3.

When the handle shaft 6, the drive shaft 21, and the sliding gear 31 rotate with respect to drive axis X2 in the first direction of rotation R1, the cam gear 33 rotates with respect to axis X3 in the second direction of rotation R2.

Figure 3:
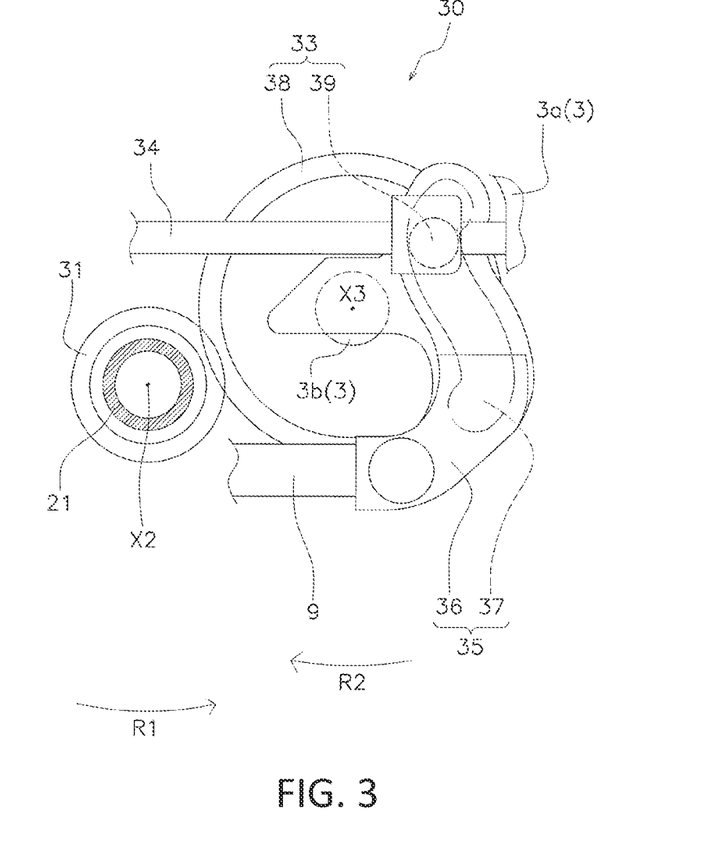
FIG. 3 is a partially enlarged side view of the oscillating mechanism.

The oscillating mechanism 30 moves the spool shaft 9 in the front-rear direction in conjunction with the rotation of the handle shaft 6. As shown in FIG. 3, the oscillating mechanism 30 includes the sliding gear 31, the cam gear 33, the guide shaft 34, and a slider 35. In FIG. 3, the teeth of the sliding gear 31 and the teeth of the cam gear 33 are shown in a simplified manner.

As described above, the sliding gear 31 constitutes the driver 13. The cam gear 33 is used for moving the slider 35 in the front-rear direction. The cam gear 33 is rotatably supported by the reel body 3. For example, the cam gear 33 is rotatably supported by a boss portion 3b (one example of the second boss portion) of the reel body 3. The cam gear 33 is arranged between the reel body 3 and the slider 35.

Here, as shown in FIGS. 2 and 3, the boss portion 3b is included in the reel body 3. That is, the reel body 3 has a body portion 3a, the boss portion 3b, and a side cover 3e (refer to FIG. 1). The body portion 3a and the side cover 3e form a space for the arrangement of the oscillating mechanism 30.

The boss portion 3b has a boss body 32 and a tubular member 41. The boss body 32 protrudes from the body portion 3a. Specifically, the boss body 32 protrudes from a side wall of the body portion 3a in an axial direction in which axis X3, which is parallel to drive axis X2, extends.

Figure 5:
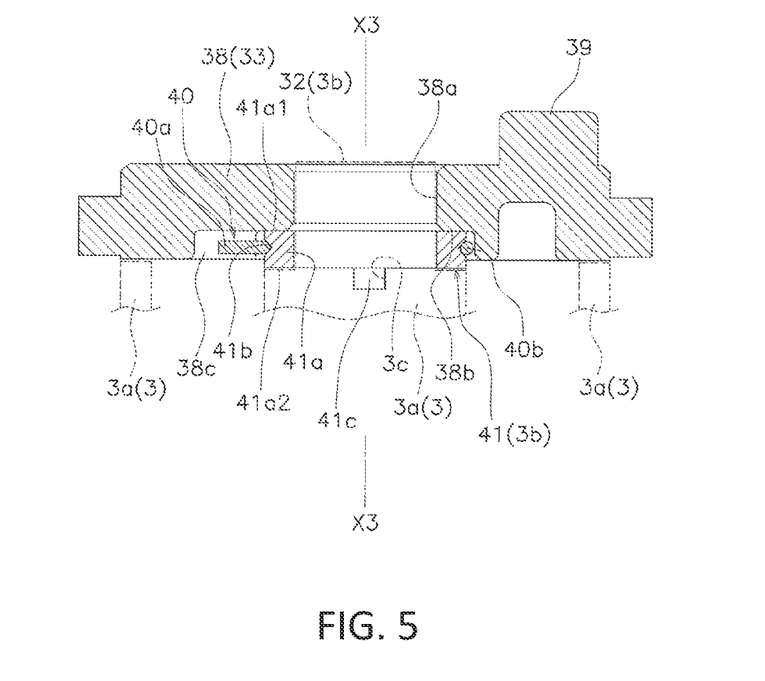
FIG. 5 is a cross-sectional view for explaining the mounting form of the sliding member and the tubular member.

As shown in FIGS. 4 and 5, the tubular member 41 is disposed between the cam gear 33 and the reel body 3. The tubular member 41 is disposed on the outer circumference of the boss body 32 so as not to rotate relative thereto. For example, the tubular member 41 is disposed between an outer circumferential surface of the boss body 32 and an inner circumferential surface of a stepped portion 38b (described further below) of the cam gear 33, in a radial direction away from axis X3. In addition, as shown in FIG. 5, the tubular member 41 is disposed between the body portion 3a and a bottom surface of the stepped portion 38b of the cam gear 33 in the axial direction in which axis X3 extends.

As shown in FIGS. 4 and 5, the tubular member 41 includes a tubular portion 41a, an annular groove 41b, and a protruding portion 41c. The tubular portion 41a is formed with a tubular shape. As shown in FIG. 5, the boss body 32 is arranged inside the tubular portion 41a.

The tubular portion 41a has a first end surface 41a1 and a second end surface 41a2. The first end surface 41a1 is arranged opposite the bottom surface of the stepped portion 38b. The second end surface 41a2 is arranged opposite the body portion 3a.

As shown in FIGS. 4 and 5, the annular groove 41b is formed on the outer circumferential surface of the tubular portion 41a. For example, the annular groove 41b is formed on the outer circumferential surface of the tubular portion 41a in the circumferential direction around axis X3. As shown in FIG. 5, a sliding portion 40b (described further below) of the sliding member 40 is disposed in the annular groove 41b.

As shown in FIGS. 4 and 5, the protruding portion 41c protrudes from the tubular portion 41a. For example, the protruding portion 41c protrudes from the second end surface 41a2 of the tubular portion 41a. As shown in FIG. 5, the protruding portion 41c is fitted into a recess 3c disposed on the reel body 3. For example, the recess 3c is disposed on a side wall of the body portion 3a of the reel body 3. In this manner, by fitting the protruding portion 41c into the recess 3c, the tubular member 41 is configured to be rotationally rigid with respect to the body portion 3a when disposed on the outer circumference of the boss body 32.

As shown in FIG. 3, the cam gear 33 has a gear body 38 and a boss portion 39 (one example of the first boss portion). The gear body 38 is supported by the reel body 3 so as to be rotatable about axis X3. The teeth of the gear body 38 mesh with the teeth of the sliding gear 31. For example, as shown in FIG. 4, the gear body 38 has a hole portion 38a, the stepped portion 38b, and a groove 38c. A boss body 32 of the reel body 3 is disposed in the hole portion 38a. Axis X3 passes through the center of the hole portion 38a. The stepped portion 38b is formed in an annular shape. The above-described tubular member 41 is disposed on the stepped portion 38b.

As shown in FIGS. 4 and 5, the groove 38c is disposed in the gear body 38, on a surface opposite to the surface on which the boss portion 39 is formed on the gear body 38. For example, the groove 38c extends outwardly from the inner circumferential surface of the stepped portion 38b in the radial direction away from axis X3. As shown in FIG. 5, an engagement portion 40a (described further below) of the sliding member 40 is disposed in the groove 38c.

As shown in FIGS. 4 and 5, the boss portion 39 protrudes from the gear body 38. For example, the boss portion 39 protrudes from the gear body 38 in the axial direction, that is in a direction in which the drive axis X2 extends. The boss portion 39 engages an engagement groove 37 of the slider 35, described further below.

As shown in FIG. 3, the boss portion 39 moves along the engagement groove 37 in conjunction with the rotation of the gear body 38 when disposed inside the engagement groove 37. The boss portion 39 is formed with a cylindrical shape. In the illustrated example, the boss portion 39 has a cylindrical shape, but the boss portion 39 can be in the form of a frustrum.

As shown in FIGS. 2 and 3, the guide shaft 34 is used for guiding the slider 35 in the front-rear direction. The guide shaft 34 is arranged above the spool shaft 9. The guide shaft 34 is arranged parallel to the spool shaft 9 (spool axis X1) and is fixed to the reel body 3 (body portion 3a).

As shown in FIGS. 2 and 3, the slider 35 is used to move the spool shaft 9 in the front-rear direction. The slider 35 is mounted on the spool shaft 9. For example, the slider 35 has a slider body 36 and the engagement groove 37. The slider body 36 is fixed to the rear end of the spool shaft 9. In addition, the guide shaft 34 is inserted through the slider body 36. The slider body 36 moves in the front-rear direction along the guide shaft 34.

As shown in FIG. 3, the boss portion 39 is disposed in the engagement groove 37. The engagement groove 37 is disposed in the slider body 36. For example, the engagement groove 37 extends upwardly from the spool shaft 9 when the slider body 36 is mounted on the spool shaft 9 and the guide shaft 34.

When the engagement groove 37 is viewed from the handle 5 side in the axial direction in which drive axis X2 extends (the case of FIG. 3), the engagement groove 37 has a curved shape. For example, in this embodiment, the engagement groove 37 has an S-like shape. The boss portion 39 engages the engagement groove 37.

The sliding member 40 shown in FIGS. 4 and 5 integrally rotates with the cam gear 33. The sliding member 40 limits the rotation of the cam gear 33 in the first direction of rotation R1. For example, the sliding member 40 slides with respect to the reel body 3. Specifically, the sliding member 40 slides with respect to the tubular member 41 included in the reel body 3.

As shown in FIG. 5, the sliding member 40 is disposed between the cam gear 33 and the reel body 3 (body portion 3a) in the axial direction in which axis X3 extends. The sliding member 40 is disposed between the cam gear 33 and the tubular member 41 in the radial direction away from the axis X3.

As shown in FIGS. 4 and 5, the sliding member 40 includes the engagement portion 40a and a sliding portion 40b. The engagement portion 40a engages a groove 38c of the cam gear 33. As shown in FIG. 4, the sliding portion 40b is integrally formed with the engagement portion 40a. As shown in FIGS. 4 and 5, the sliding portion 40b extends along the outer surface of the tubular member 41.

For example, as shown in FIG. 4, the sliding portion 40b extends from the engagement portion 40a along the outer surface of the tubular member 41 in the second direction of rotation R2. The sliding portion 40b slides with respect to the outer surface of the tubular member 41. Specifically, the sliding portion 40b is arc-shaped. The sliding portion 40b extends from the engagement portion 40a along the annular groove 41b in the second direction of rotation R2. The sliding portion 40b slides with respect to the annular groove 41b.

The spinning reel 1 described above has the following features. In the present spinning reel 1, when the sliding gear 31 rotates in the first direction of rotation R1, the cam gear 33 rotates in the second direction of rotation R2. At this time, because the sliding member 40 limits the rotation of the cam gear 33 in the first direction of rotation R1, it is possible to prevent the meshing between the sliding gear 31 and the cam gear 33 from becoming unstable.

For example, when the cam gear 33 rotates in the first direction of rotation R1 in conjunction with the rotation of the sliding gear 31, the sliding member 40 rotates integrally with the cam gear 33. At this time, because the sliding member 40 slides with respect to the reel body, for example, the tubular member 41, friction force is generated between the sliding member 40 and the reel body 3. That is, this friction force acts on the cam gear 33 via the sliding member 40.

As a result, it is possible to prevent the meshing between the sliding gear 31 and the cam gear 33 from becoming unstable. In addition, in this configuration, the tubular member 41 is mounted on the body portion 3a of reel body 3. Specifically, the protruding portion 41c of the tubular member 41 is fitted into the recess 3c of the reel body 3 (body portion 3a). As a result, if the tubular member 41 becomes worn, the tubular member 41 can be easily replaced.

In the present spinning reel 1, the engagement portion 40a of the sliding member 40 engages with the groove 38c of the cam gear 33, thereby causing the sliding member 40 to rotate integrally with the cam gear 33. In this state, because the sliding portion 40b of the sliding member 40 slides with respect to the outer surface of the tubular member 41, the above-mentioned friction force acts on the cam gear 33 via the sliding member 40. As a result, it is possible to suitably prevent the meshing between the sliding gear 31 and the cam gear 33 from becoming unstable.

In the present spinning reel 1, the direction in which the arc-shaped sliding portion 40b extends along the outer surface of the tubular member 41 is the same as the second direction of rotation R2 in which the cam gear 33 rotates. Therefore, when the fishing line is wound, because the internal diameter of the arc-shaped sliding portion 40b increases, it is possible to reduce the friction force that acts on the sliding member 40. As a result, the handle shaft 6 can be smoothly rotated as the line is wound.

On the other hand, when an attempt is made to rotate the cam gear 33 in the first direction of rotation R1, because the arc-shaped sliding portion 40b is tightened and the internal diameter of the arc-shaped sliding portion 40b decreases, it is possible to increase the friction force that acts on the sliding member 40. As a result, it is possible to prevent the meshing between the sliding gear 31 and the cam gear 33 from becoming unstable.

Modified Example 1

In the above-described embodiment, an example was presented in which the tubular member 41 is mounted on the body portion 3a. The tubular member 41 can instead be mounted on the boss body 32. In this embodiment, the inner circumferential surface of the tubular portion 41a of the tubular member 41 is press-fitted onto the outer circumferential surface of the boss body 32. In this embodiment, the protruding portion 41c shown in FIGS. 4 and 5 can be omitted from the configuration of the tubular member 41.

Even with this configuration, the friction force that is generated due to the sliding of the sliding member 40 and the tubular member 41 acts on the cam gear 33 via the sliding member 40. As a result, it is possible to prevent the meshing between the sliding gear 31 and the cam gear 33 from becoming unstable, in the same manner as in the embodiment described above. Further, if the tubular member 41 becomes worn, the tubular member 41 can be easily replaced.

Modified Example 2

Figure 6:
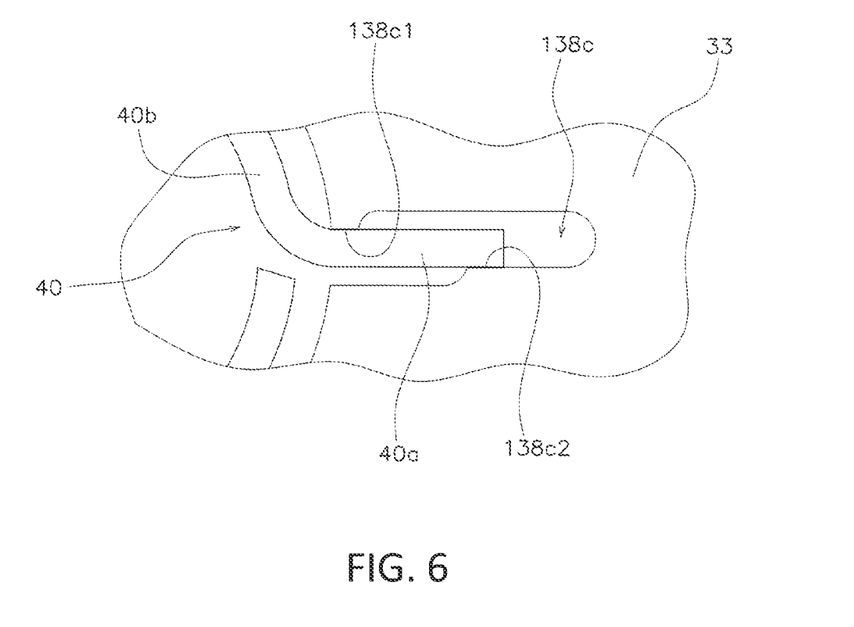
FIG. 6 is a diagram for explaining the shape of the groove of a cam gear in a modified example of the present invention.

In the above-described embodiment, an example is presented in which the engagement portion 40a of the sliding member 40 is disposed in the groove 38c of the cam gear 33. As shown in FIG. 6, a groove 138c of the cam gear 33 can have a first abutting portion 138c1 and a second abutting portion 138c2. In this embodiment, the proximal end portion of the engagement portion 40a of the sliding member 40 abuts the first abutting portion 138c1. The distal end portion of the engagement portion 40a of the sliding member 40 abuts the second abutting portion 138c2.

In this configuration, the engagement portion 40a of the sliding member 40 is held by the first abutting portion 138c1 and the second abutting portion 138c2. As a result, the friction force that is generated due to the sliding of the sliding member 40 and the tubular member 41 can be suitably applied to the cam gear 33 via the sliding member 40.

Modified Example 3

Figure 7:
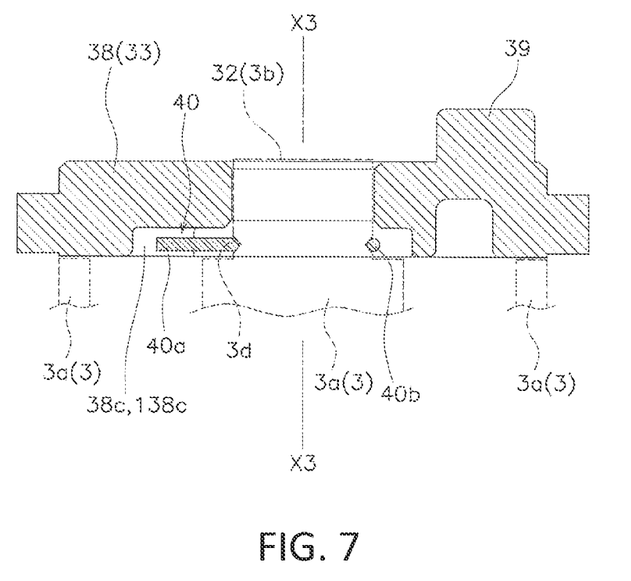
FIG. 7 is a cross-sectional view for explaining the mounting form of the sliding member in a modified example of the present invention.

In the above-described embodiment, an example was presented in which the sliding member 40 slides with respect to the tubular member 41. As shown in FIG. 7, the sliding member 40 can instead be configured to slide with respect to the boss body 32 without using the tubular member 41.

In this embodiment, the sliding member 40 is disposed between the cam gear 33 and the boss portion 3*b* in the radial direction away from the axis X3. The boss body 32 has an annular groove 3*d*. The annular groove 3*d* is formed on the outer circumferential surface of the boss body 32. For example, the annular groove 3*d* is formed on the outer circumferential surface of the boss body 32 in the circumferential direction around the axis X3.

The sliding member 40 has the engagement portion 40*a* and the sliding portion 40*b*, in the same manner as in the above-described embodiment. The configurations of the engagement portion 40*a* and the sliding portion 40*b* are essentially the same as those in the above-described embodiment. The sliding portion 40*b* extends along the outer surface of the boss body 32. For example, the sliding portion 40*b* is formed with an arc shape. The sliding portion 40*b* extends from the engagement portion 40*a* along the outer surface of the boss body 32 in the second direction of rotation R2. The sliding portion 40*b* is disposed on the outer surface of the boss body 32. For example, the sliding portion 40*b* is disposed in the annular groove 3*d* of the boss body 32. In this state, the sliding portion 40*b* slides with respect to the annular groove 3*d* of the boss body 32.

In this configuration, since the sliding member 40 slides with respect to the boss body 32 of the reel body 3, the friction force that is generated due to the sliding of the sliding member 40 and the boss body 32 acts on the cam gear 33 via the sliding member 40. As a result, it is possible to prevent the meshing between the sliding gear 31 and the cam gear 33 from becoming unstable. In addition, when the fishing line is wound, because the internal diameter of the arc-shaped sliding portion 40*b* increases, the friction force that acts on the sliding member 40 can be reduced. As a result, the handle shaft 6 can be smoothly rotated as the line is wound.

Modified Example 4

In the above-described embodiment and the above-described modified examples 1 and 2, examples were presented in which the annular groove 41*b* is formed on the outer circumferential surface of the tubular member 41 in order to slide the sliding member 40 on the outer circumferential surface of the tubular member 41. As long as the sliding member 40 can be made to slide on the outer circumferential surface of the tubular member 41, the portion of the sliding member 40 that slides with respect to the tubular member 41 can have any form. For example, instead of the annular groove 41*b*, an annular stepped portion can be formed on the outer circumferential surface of the tubular member 41.

Second Embodiment

Figure 8:
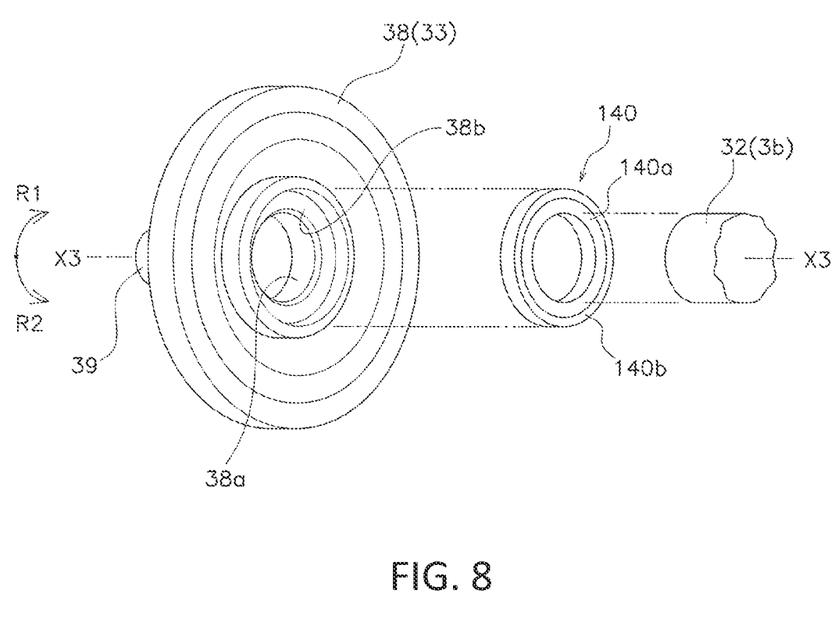
FIG. 8 is an exploded perspective view for explaining the configuration of the one-way clutch according to a second embodiment of the present invention.

As shown in FIG. 1, a spinning reel 101 in the second embodiment includes the reel body 3, the handle 5, the rotor 7, the spool 11, the driver 13 (refer to FIG. 2), the oscillating mechanism 30 (one example of the reciprocating mechanism, refer to FIG. 2), and a one-way clutch 140 (one example of the rotation limiting member; refer to FIG. 8).

Except for the one-way clutch 140, the configuration of the spinning reel 101 is essentially the same as the configuration of the first embodiment. Here, descriptions of configurations that are the same as the configurations in the first embodiment are omitted.

Figure 9:
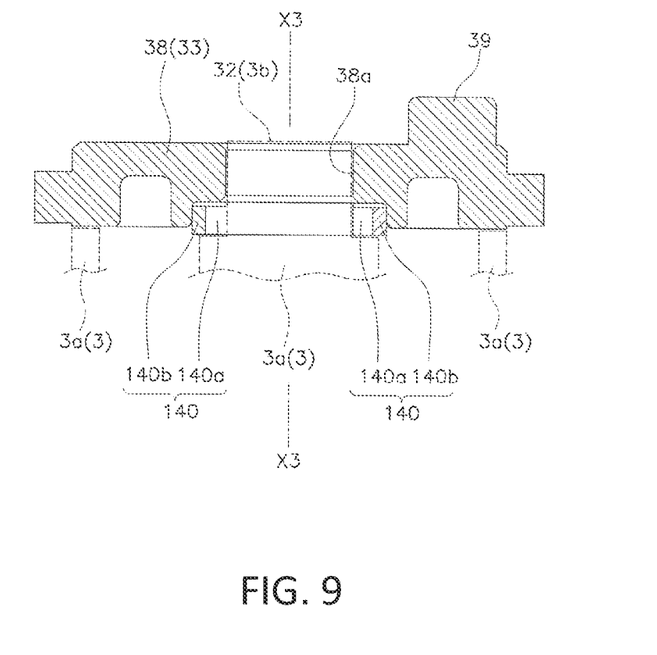
FIG. 9 is a cross-sectional view for explaining the mounting form of the one-way clutch according to the second embodiment of the present invention.

As shown in FIGS. 8 and 9, the one-way clutch 140 is disposed between the cam gear 33 and the boss portion 3*b* (one example of the second boss portion). For example, the one-way clutch 140 is disposed between the gear body 38 and the boss body 32 in the radial direction away from axis X3.

As a result, the boss body 32 of the boss portion 3*b* supports the gear body 38 of the cam gear 33 so as to be rotatable via the one-way clutch 140. In this state, the one-way clutch 140 enables rotation of the cam gear 33 in the second direction of rotation R2 and restricts the rotation of the cam gear 33 in the first direction of rotation R1.

The one-way clutch 140 has a rolling element 140*a* and an outer race 140*b*. The rolling element 140*a* is disposed on the outer circumferential surface of the boss body 32. For example, the rolling element 140*a* is disposed between the outer race 140*b* and the outer circumferential surface of the boss body 32 in the radial direction away from axis X3.

The one-way clutch 140 can further have an inner race. In this embodiment, the inner race is disposed on the outer circumferential surface of the boss body 32. The rolling element 140*a* is disposed between the inner race and the outer race 140*b* in the radial direction away from the axis X3.

The outer race 140*b* is disposed on the outer side of the rolling element 140*a* in the radial direction away from axis X3. The outer race 140*b* is disposed on the stepped portion 38*b* of the gear body 38. For example, the outer race 140*b* is mounted on the inner circumferential surface of the stepped portion 38*b* of the gear body 38 so as to be rotationally rigid. Specifically, the outer race 140*b* is press-fitted into the inner circumferential surface of the stepped portion 38*b* of the gear body 38.

The spinning reel 1 described above has the following features. For example, in the present spinning reel 1, when the sliding gear 31 rotates in the first direction of rotation R1, the cam gear 33 rotates in the second direction of rotation R2. At this time, because the one-way clutch 140 restricts the rotation of the cam gear 33 in the first direction of rotation R1, it is possible to prevent an unstable meshing between the sliding gear 31 and the cam gear 33.

Embodiments of the present invention can be used in a spinning reel.

What is claimed is:

1. A spinning reel, comprising:
   a reel body;
   a handle shaft rotatably supported with respect to the reel body;
   a spool shaft movably supported in a front-rear direction with respect to the reel body;
   a reciprocator including a first gear configured to rotate in a first direction of rotation in conjunction with rotation of the handle shaft, a second gear including a gear body configured to mesh with the first gear and a first boss portion protruding from the gear body and configured to rotate in a second direction of rotation opposite to the first direction of rotation, and a slider mounted on the spool shaft and including an engagement groove with which the first boss portion is configured to engage; and
   a limiter disposed between the reel body and the second gear and being configured to limit the rotation of the second gear in the first direction of rotation.

2. The spinning reel according to claim 1, wherein
the limiter is a sliding member configured to rotate integrally with the second gear and slide with respect to the reel body.

3. The spinning reel according to claim 2, wherein
the reel body has a second boss portion supporting the second gear so as to be rotatable, and
the sliding member is disposed between the second gear and the second boss portion and is configured to slide with respect to the second boss portion.

4. The spinning reel recited in claim 3, wherein
the second gear has a groove disposed in the gear body, and
the sliding member has an engagement portion configured to engage the groove and a sliding portion integrally formed with the engagement portion, extends along an outer surface of the second boss portion, and is configured to slide with respect to the outer surface of the second boss portion.

5. The spinning reel according to claim 4, wherein
the sliding portion has an arc shape and extends from the engagement portion along the outer surface of the second boss portion in the second direction of rotation.

6. The spinning reel according to claim 3, wherein
the second boss portion has a boss body, and a tubular member mounted on an outer circumference of the boss body so as to be rotationally fixed, and
the sliding member is disposed between the second gear and the tubular member and is configured to slide with respect to the tubular member.

7. The spinning reel according to claim 1, wherein
the reel body has a second boss portion rotatably supporting the second gear,
the limiter is a one-way clutch disposed between the second gear and the second boss portion, and
the one-way clutch enables the rotation of the second gear in the second direction of rotation and is configured to restrict the rotation of the second gear in the first direction of rotation.

* * * * *